United States Patent [19]
Brakefield

[11] Patent Number: 5,892,697
[45] Date of Patent: Apr. 6, 1999

[54] METHOD AND APPARATUS FOR HANDLING OVERFLOW AND UNDERFLOW IN PROCESSING FLOATING-POINT NUMBERS

[76] Inventor: James Charles Brakefield, 1214 Vista Del Rio, San Antonio, Tex. 78216

[21] Appl. No.: 574,919

[22] Filed: Dec. 19, 1995

[51] Int. Cl.⁶ .................................................. G06F 7/38
[52] U.S. Cl. .............................. 364/748.02; 364/715.03; 364/745.01
[58] Field of Search ................. 364/715.03, 715.04, 364/736, 745, 748, 749

[56] References Cited

U.S. PATENT DOCUMENTS

| | | | |
|---|---|---|---|
| 4,305,134 | 12/1981 | Joyce et al. | 364/748 |
| 4,617,641 | 10/1986 | Hamada | 364/748 |
| 4,758,973 | 7/1988 | Ooyama et al. | 364/748 |
| 4,796,217 | 1/1989 | Takahashi et al. | 364/745 |
| 4,839,846 | 6/1989 | Hirose et al. | 364/748 |
| 5,258,943 | 11/1993 | Gamez et al. | 364/745 |
| 5,268,855 | 12/1993 | Mason et al. | 364/748 |
| 5,384,723 | 1/1995 | Karim et al. | 364/748 |
| 5,424,968 | 6/1995 | Okamoto | 364/748 |

OTHER PUBLICATIONS

J. T. Coonen, *An implementation Guide to a Proposed Standard for Floating–Point Arithmetic*, Computer, Jan. 1980 at 68–79.

W. J. Cody, et al, *A Proposed Radix– and Word–length–independent Standard for Floating–point Arithmetic*, IEEE Micro, Aug. 1984 at 86–100.

ANSI/IEEE Std 754–1985, IEEE Standard for Binary Floating–Point Arithmetic (1985).

ANSI/IEEE Std 854–1987, IEEE Standard for Radix–Independent Floating–Point Arithmetic (1987).

*Primary Examiner*—Chuong Dinh Ngo
*Attorney, Agent, or Firm*—Royston, Rayzor, Vickery, Novak & Druce, L.L.P.

[57] ABSTRACT

A method for processing floating-point numbers, each floating-point number having at least sign portion, an exponent portion and a mantissa portion, comprising the steps of converting a floating-point number memory register representation to a floating-point register representation; rounding the converted floating-point number; performing an arithmetic computation upon said rounded number resulting in a new floating-point value; and converting the resulting new floating-point register value to a floating-point memory register representation. An apparatus for processing floating-point numbers comprising means for converting a floating-point value from a random access memory register to a floating-point unit register; means for selecting the type of accuracy required of the converted value; means for selecting the type of rounding required of the converted floating-point value; means for performing an arithmetic operation upon at least one converted floating-point value based upon said selected accuracy and rounding; means for chopping the result of the arithmetic operation to fit a mantissa portion of a floating-point value; and means for converting the resulting floating-point value from the floating-point register representation to the random access memory representation.

28 Claims, 6 Drawing Sheets

METHOD AND APPARATUS FOR HANDLING OVERFLOW AND UNDERFLOW IN PROCESSING FLOATING-POINT NUMBERS

BACKGROUND OF THE INVENTION

1. Field of Invention

This invention relates generally to a method for processing floating-point numbers. More specifically, but not by way of limitation, it is directed to a technique for representing floating-point numbers in a memory register format and floating-point register format in a manner that allows the handling of overflow and underflow floating-point numbers, thereby eliminating denormalization in memory and exponent modification from rounding.

2. Related Art

In an effort to unify methods employed in computer systems for performing binary floating-point arithmetic, the IEEE in the early 1980's standardized computer floating-point numbers. Such binary floating-point numbers make possible the manipulation of large as well as small numbers with great precision, and thus are often used in scientific calculations. They typically comprise either single precision format or double precision format, with single precision operating on 32-bit operands and double precision operating on 64-bit operands. Both single and double precision numbers constitute a bit-string characterized by three fields: a single sign bit, several exponent bits, and several fraction or mantissa bits, with the sign bit being the most significant bit, the exponent bits being the next most significant, and the mantissa bits being the least significant.

A normalized nonzero number X in the single format has the form $$X = (-1)^S * 2^{E-127} * (1.F) \text{ where}$$

S = sign bit
E = 8-bit exponent biased by 127
F = X's 23-bit fraction which, together with an implicit leading 1, yields the significant digit field "1. - - - "

In the conventional floating-point representation, the boundary between the exponent and mantissa parts is fixed, resulting in a constant number of bits representing the exponent. As such, the range of values that can be represented is limited. Even if there are unused exponential or mantissa bits, such free bits cannot be used for other purposes. Therefore, conventional floating-point number representation is not flexible enough to utilize the unused space of the exponent part thereby improving the precision of the mantissa, or to utilize any unused space of the mantissa part thereby improving the precision of the exponent.

In other floating-point representations, the size of the exponent or mantissa is a variable length. This variable length allows for underflow representation of numbers very close to zero, and for overflow representation of very large numbers which would normally produce an infinite number. IEEE floating-point standards have a feature called gradual underflow which handles numbers close to zero. The format employed is termed denormalized numbers and is difficult to implement in hardware. In some cases, such as in rounding, the adjustment of the exponent to handle underflow and overflow numbers creates a denormalized floating-point number. Denormalized numbers require additional processing which conflicts with the efficient processing of the vast remaining majority of floating-point numbers.

According to IEEE Standard 754, a denormalized number is a nonzero floating-point number whose exponent has a reserved value, usually the format's minimum, and whose explicit or implicit leading significant bit is zero. As such, its represented number is $$X = (-1)^S * 2^{-126} * (L.F) \text{ where}$$

S = sign bit
L = Leading bit, or (0)
F = Fraction, or nonzero

Two correlated events contribute to underflow. One is the creation of a tiny nonzero result between $\pm 2^{Min\ E}$ which, because it is so tiny, may later cause some other exception such as overflow upon division. The other event is the extraordinary loss of accuracy during the approximation of such tiny numbers by denormalized numbers. Loss of accuracy may be detected as either a denormalization loss—when the delivered result differs from what would have been computed were exponent range unbounded—or, an inexact result—when the delivered result differs from what would have been computed were both exponent range and precision unbounded. The IEEE Standard 754 does not track accuracy other than to require single and double precision.

For digital computer processors, the complexities of the IEEE Standard 754 increase the design and manufacturing cost of the processor. Additional hardware and processing time is required to handle denormalized numbers in order to maintain the integrity of the data. For some computer applications such as real-time signal processing, it is desirable to have a fixed time duration for computations. The additional requirement and cost of seldom used circuitry to handle underflow and overflow numbers generates variations in compute time which, in turn, create difficulty in design and validation of the computer system. At the microprocessor level, it is desirable that operations take fixed-time durations and that seldom used circuitry be avoided.

In the current era of RISC microprocessors with pipelined floating-point data, there are specific floating-point registers and a dedicated floating-point unit. Data movement, both to and from memory, is handled by floating-point load and store instructions. This presents the opportunity for the memory floating-point format to be optimized separately from the register floating-point format. Memory format optimization involves information density, i.e., providing the greatest accuracy in a specific memory element. Register format optimization involves supporting the most efficient floating-point arithmetic unit.

The present invention has been designed to provide a method to efficiently handle such overflow and underflow numbers. The present invention provides a means whereby rounding of the result does not adjust the exponent value. It also supplies a means wherein memory data has precision encoded with a loss of one bit of mantissa. In addition, the present invention provides a means whereby both floating-point memory and register data are always normalized, such normalization accomplished using minimal hardware in the load/store paths. The present invention also allows conditional actions to be performed in hardware in parallel thereby minimizing processing duration and avoiding the need for seldom used circuitry. In reshaping the IEEE format, the present invention retains most of its benefits while offering the microprocessor designer and the real-time programmer a much cleaner and more efficient implementation.

SUMMARY OF THE INVENTION

A method and system has been conceived whereby a floating-point processing unit is able to handle overflow and underflow conditions while performing floating-point arithmetic, and whereby the operands from the floating-point processing unit are stored in memory registers in a normalized format. This is accomplished by means of a floating-point arithmetic processing system having a random access memory (RAM) with a plurality of memory registers for storing floating-point operands expressed in a memory register format, and a floating-point unit with a plurality of floating-point registers for storing floating-point operands expressed in a floating-point register format. A loading means coupled to both the RAM and the floating-point unit is provided for retrieving operands from the RAM, translating the operands from the memory register format into the floating-point register format, and supplying the floating-point unit with the translated operands. A storing means coupled to the RAM and to the floating-point unit is provided for retrieving operation results from the floating-point unit, translating the operands from the floating-point register format into the memory floating point register format, and supplying the RAM with the translated operands. An arithmetic logic means coupled to the floating-point unit is provided for rounding operands prior to the arithmetic operation, performing the operation and truncating the result. By "coupling," it should be understood that elements may be connected together in such a way that there are other components interstitially located between the connected elements, or that the elements may be connected in a fixed or movable manner relative one to the other.

The RAM memory register format is comprised of a memory sign field, a memory exponent field, and a memory mantissa field. The memory sign field includes a sign bit indicative of the sign of the number being represented. The memory exponent field comprises a predetermined number of bits for representing an exponent of a floating-point number being represented, with the memory exponent field comprising eight (8) bits for a single precision floating-point number and eleven (11) bits for a double precision floating-point number. The memory mantissa field comprises a predetermined number of bits—twenty-three (23) bits for a single precision floating-point number, and fifty-two (52) bits for a double precision floating-point number.

Regarding the memory mantissa field, it is comprised of a memory mantissa data section, a memory mantissa accuracy section, and a memory underflow/overflow section. In the present invention, the three sections of the memory mantissa field vary in size depending upon diverse factors including whether the memory exponent is of underflow or overflow value, and whether the memory value is of exact accuracy, implied accuracy, with an accuracy field for only normal numbers, or with an accuracy field for both normal and underflow/overflow numbers. The number of bits of the memory mantissa data section is dependent upon the accuracy of the mantissa of the floating-point number being represented and its being left-justified in the memory mantissa field.

The memory underflow/overflow section has a variable number of bits dependent upon a memory exponent bias. For example, if the memory exponent is normal, i.e., not that of underflow or overflow, then the memory underflow/overflow section is empty, or unnecessary. The memory accuracy section number of bits is dependent upon both the accuracy of the mantissa of the floating-point number being represented, and the size of the memory underflow/overflow section.

Memory-held floating-point numbers have an implied mode which is not directly represented with the number. The modes are exact, maximal accuracy, encoded accuracy for normals, and encoded accuracy for both normals and underflow/overflow. If the memory value is of implied accuracy or exact, then the mantissa accuracy section is empty, i.e., accuracy encoding is not used. If the memory value is with an accuracy field for only normal numbers and the memory exponent is that of underflow or overflow, then there is no accuracy section. When the memory value is with an accuracy field for both normal numbers and underflow/overflow numbers, the memory mantissa accuracy section always exists, and the memory underflow/overflow section may exist. The mantissa data section is what remains after either the underflow/overflow section or the accuracy section has been removed.

With respect to the floating-point unit floating-point register, it is comprised of a floating-point exponent field of at least thirteen (13) bits, a normalized floating-point mantissa field of at least fifty-three (53) bits, a floating-point accuracy field of at least six (6) bits, a floating-point exact bit, and a floating-point status field of at least two (2) bits. This is sufficient to represent double precision numbers and the result from multiplying or dividing two underflow or overflow values. It is also adequate to represent zero, infinity or NaN without using special exponent or mantissa values. The floating-point exponent field is further comprised of a floating-point exponent data section, a floating-point underflow/overflow section, and a floating-point product/quotient section. The floating-point mantissa field is comprised of a floating-point mantissa data section, and, optionally, in accord with the IEEE standards, a floating-point mantissa guard section, a floating-point mantissa round section, and a floating-point mantissa sticky section.

Utilizing the value in the floating-point register converted by the load means from the memory register, the arithmetic logic means performs its computation upon the operand. However, prior to doing so it first rounds the value. By rounding, the arithmetic logic means replaces the inaccurate portion of the mantissas of the arithmetic unit operands by either all zero bits, all one bits, the accuracy section of the mantissa, or the complement of the accuracy section. Rounding, and thereby adjusting, the operand is contrary to the IEEE 754 rounding of results. The benefit of rounding the operand instead of the result is that carry propagation is eliminated and no exponent adjustment is required. Additionally, due to the lack of result rounding, arithmetic operations have a more efficient implementation. In particular, it becomes possible to have fewer pipeline stages or eliminate conditionally performed pipeline stages thereby shortening the total logic delay of the arithmetic operation.

Once computed, the result is merely truncated, or chopped, to fit the floating-point register's mantissa. The chop treatment of arithmetic results require fewer bits of mantissa in the floating-point unit. Currently, hardware floating-point values include guard, round and sticky bits in the mantissa. The present invention works with or without additional mantissa bits.

Accordingly, the objectives of this invention are to provide, inter alia,

1. A method and apparatus for handling underflow in floating-point numbers that is straightforward and efficient to implement in hardware.
2. A method and apparatus for handling underflow in floating-point numbers that is more efficient than IEEE standards.
3. A method and apparatus for simplifying rounding of floating-point numbers that does not generate a denormalized or infinite number.

4. A method and apparatus for simplifying rounding of floating-point numbers that eliminates carry propagation and exponent adjustment in rounding.

5. A method and apparatus for handling underflow in floating-point numbers that simplifies real-time software design and validation.

6. A method and apparatus for representing overflow that provides a symmetrical situation regarding the exponent range.

7. A method and apparatus for handling floating-point numbers that gives the ability to provide accuracy indication.

Other objects and advantages will become apparent from the detailed description of the invention and the appended claims.

BRIEF DESCRIPTION OF THE DRAWINGS

The manner in which these objectives and other desirable characteristics can be obtained is explained in the following description and attached drawings in which.

DETAILED DESCRIPTION OF THE INVENTION

A method and apparatus for handling floating-point numbers is described. In the following description, numerous specific details are set forth, such as specific bit lengths, register contents, block diagrams, etc., in order to provide a thorough understanding of the present invention. It will be obvious, however, to one skilled in the art that these specific details need not be used to practice the present invention. In other instances, well-known structures and circuits have not been shown in detail in order not to unnecessarily obscure the present invention.

Floating-Point Data Format.

Figure 1:
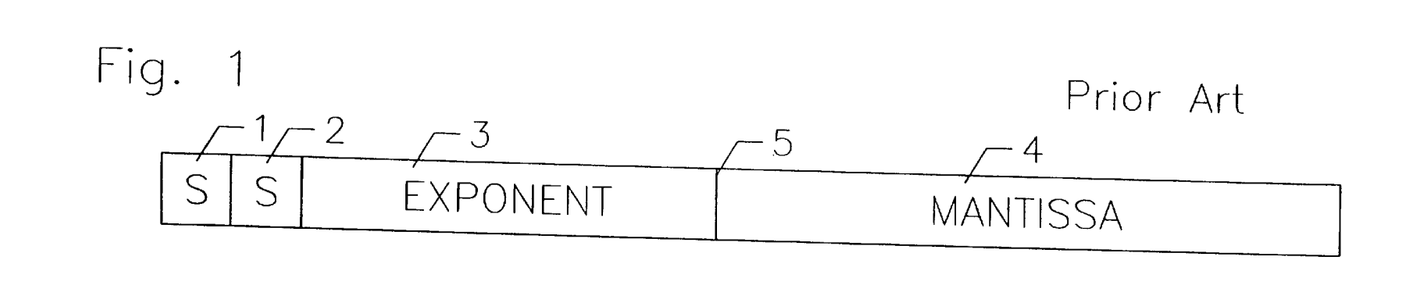
FIG. 1 illustrates a floating-point data according to the conventional floating-point representation using binary code having a fixed-length exponent part and a fixed-length mantissa part.

FIG. 1 illustrates a typical example of data expressed in the conventional floating-point representation using binary code. According to FIG. 1, reference numeral 1 indicates a bit representing the sign information of a numerical value, i.e., the sign information of a mantissa, while reference numeral 2 identifies a bit representing the sign information of the exponent. Portions indicated by reference numerals 2 and 3 are collectively referred to as an exponent part. Reference numeral 4 designates the mantissa part and reference numeral 5 represents the boundary between the exponent part and the mantissa part. Exponent bias is 127 for single precision and 1023 for double precision, and the exponent true value is the exponent field value minus the bias value.

Various formats have been proposed by different entities utilizing different exponent and mantissa sizes. Literature on these types of encoding typically has an additional floating-point format field which resolves into each value of the additional field implying specific exponent and mantissa field sizes. For example, a format field of one additional bit allows two sets of exponent and mantissa field sizes. For 32-bit floating-point numbers, this could be represented by an 8-bit exponent and 22-bit mantissa or an 11-bit exponent and 19-bit mantissa, which together with the format and sign bits gives 32 bits. A format field of two bits would allow four different combinations of exponent and mantissa field sizes.

Figure 2:
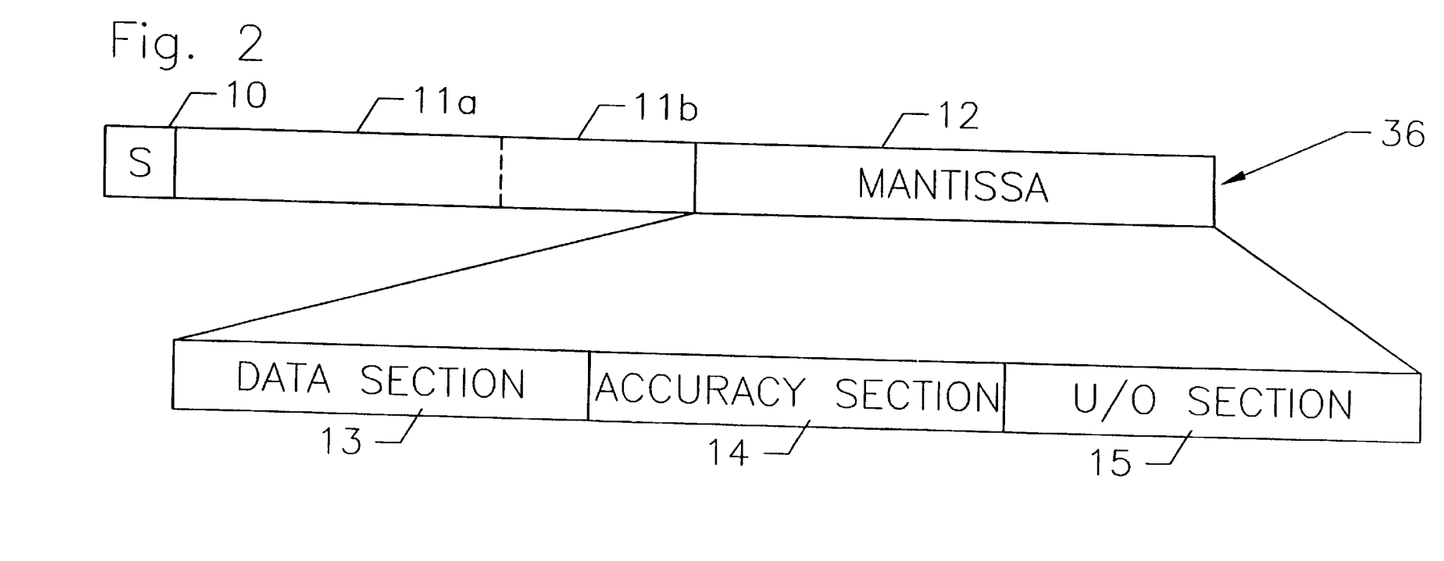
FIG. 2 illustrates a memory register format representation of a floating-point operand according to the present invention.

FIG. 2 shows a memory register format used to store floating-point operands in a memory register unit according to the present invention. This format is comprised of the memory sign field 10 for storing a bit representing the sign information of an operand stored in a memory register, the memory exponent field 11 of the operand, and the mantissa field 12 of the operand. The memory mantissa field 12 is further divided into a memory mantissa data section 13, a memory mantissa accuracy section 14, and a memory mantissa underflow/overflow section 15. Preferred exponent bias is 128 for single precision and 1024 for double precision.

The memory exponent field 11 comprises eight or eleven exponent bits, depending upon whether the number is single precision or double precision, respectively. The memory mantissa field 12 consists of 23 bits for single precision and 52 bits for double. The most significant mantissa bit of normalized values is implied, i.e., it is not stored as it is known to be a one.

A memory value can be one of the following states:

1) normal, underflow exponent, overflow exponent
2) zero
3) plus infinity, negative infinity, or
4) not-a-number (NaN)

with NaN referring to a binary code signifying that the value is otherwise not representable. A normal exponent 11 is any exponent 11 not requiring underflow/overflow representation 15 in the memory data format. For the present invention, 32-bit memory encodings for the various states are as illustrated in the following table:

TABLE 1

|  | Sign | Exponent | Mantissa (with implied leading 1) |
| --- | --- | --- | --- |
| Zero: | 0 | 00000000 | 00000000000000000000000 |
| NaN: | 1 | 00000000 | 00000000000000000000000 |

TABLE 1-continued

|  | Sign | Exponent | Mantissa (with implied leading 1) |
|---|---|---|---|
| +Infinity: | 0 | 11111111 | 00000000000000000000000 |
| −Infinity: | 1 | 11111111 | 00000000000000000000000 |
| One: | 0 | 10000000 | 00000000000000000000000 |
| Underflow: | s | 00000000 | xxxxxxxxxxx100000000000 = v*1.x*$2^{(0-128-11)}$ |
| Overflow: | s | 11111111 | yyyyyyyyyyyyyyyy1000000 = v*1.y*$2^{(255-128+6)}$ |
| Explicit Acc: | s | uuuuuuuu | zzzzzzzzzzzzzz10000000 = v*1.z*$2^{(u-128)}$ |
|  |  |  | where v = 1−2*s |

As illustrated in the above table, for underflow, overflow and explicit accuracy, each memory representation has a variable number of mantissa bits followed by a trailing or reversed comma code (RCC) 15. For underflow or overflow numbers, the right or least significant end of the mantissa 12 is used to represent the degree of underflow or overflow. This representation is the RCC 15 and, reading from the rightmost bit to to the left, one mantissa bit at a time, is comprised of zero or more zero bits and a terminating one bit. The number of zero bits is the value of the code 15. In the above table, the underflow example has a RCC 15 of eleven (11), the overflow example has a RCC 15 of six (6), and the explicit accuracy example has a RCC 15 of eight (8).

Figure 4:
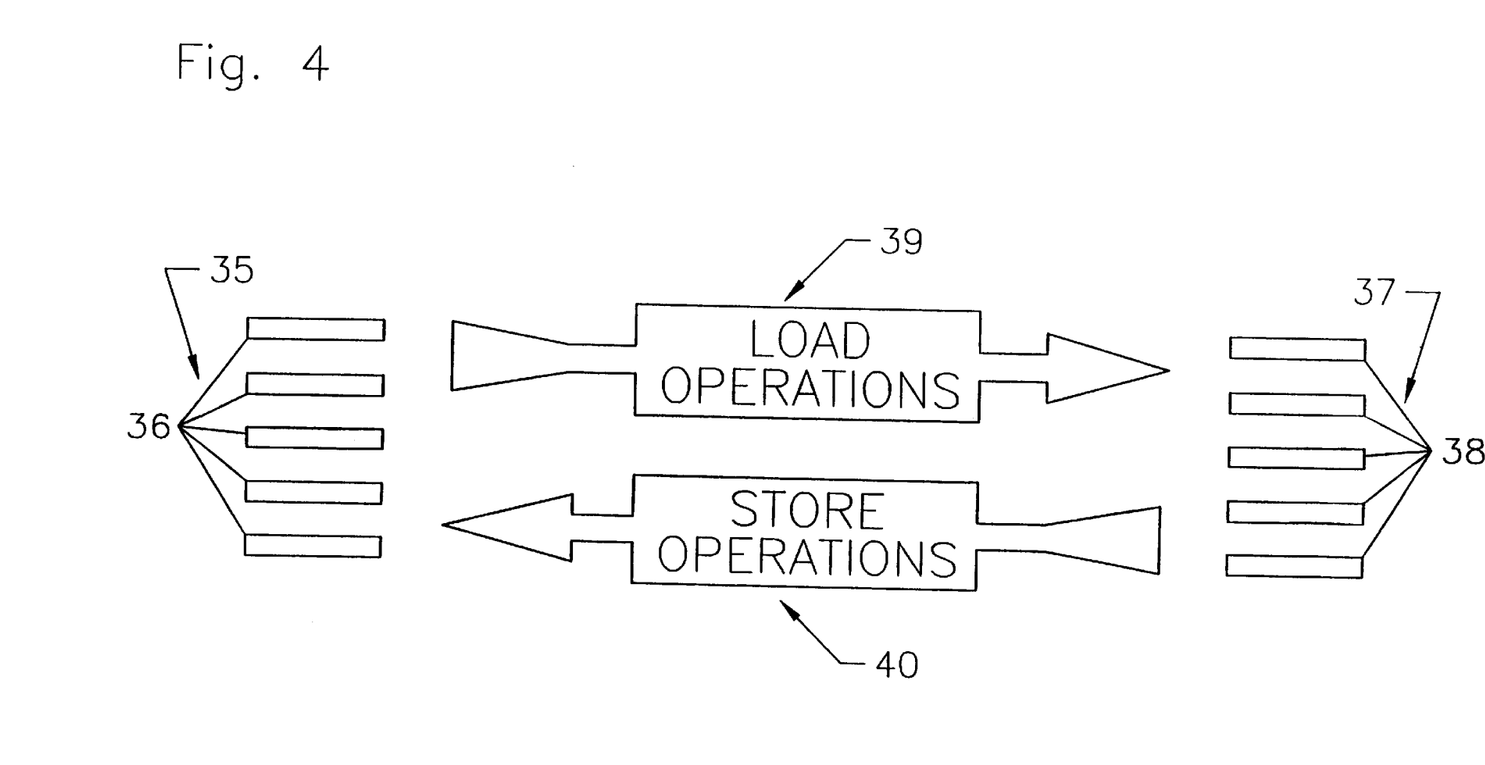
FIG. 4 is a block diagram generally illustrating the method of transferring floating-point operands from memory registers to floating-point registers, and from floating-point registers to memory registers.

By using RCC's 15 to represent the degree of underflow or overflow normalization of the mantissa is not required in converting a memory value 36 to a register value 38 and denormalization is not require in converting a register value 38 to a memory value 36. RCC 15 codes for underflow representation are equivalent to the set of denormalized numbers in the IEEE 754. By using RCC 15 codes for overflow representation, a set of values corresponding to underflow numbers is provided thereby creating a symmetric number range, i.e., gradual loss of accuracy, contrary to the IEEE Standard 754 which forces the overflow value to either positive or negative infinity. It should be noted that an equally valid RCC code is zero or more one bits followed by a trailing zero bit.

Figure 3:
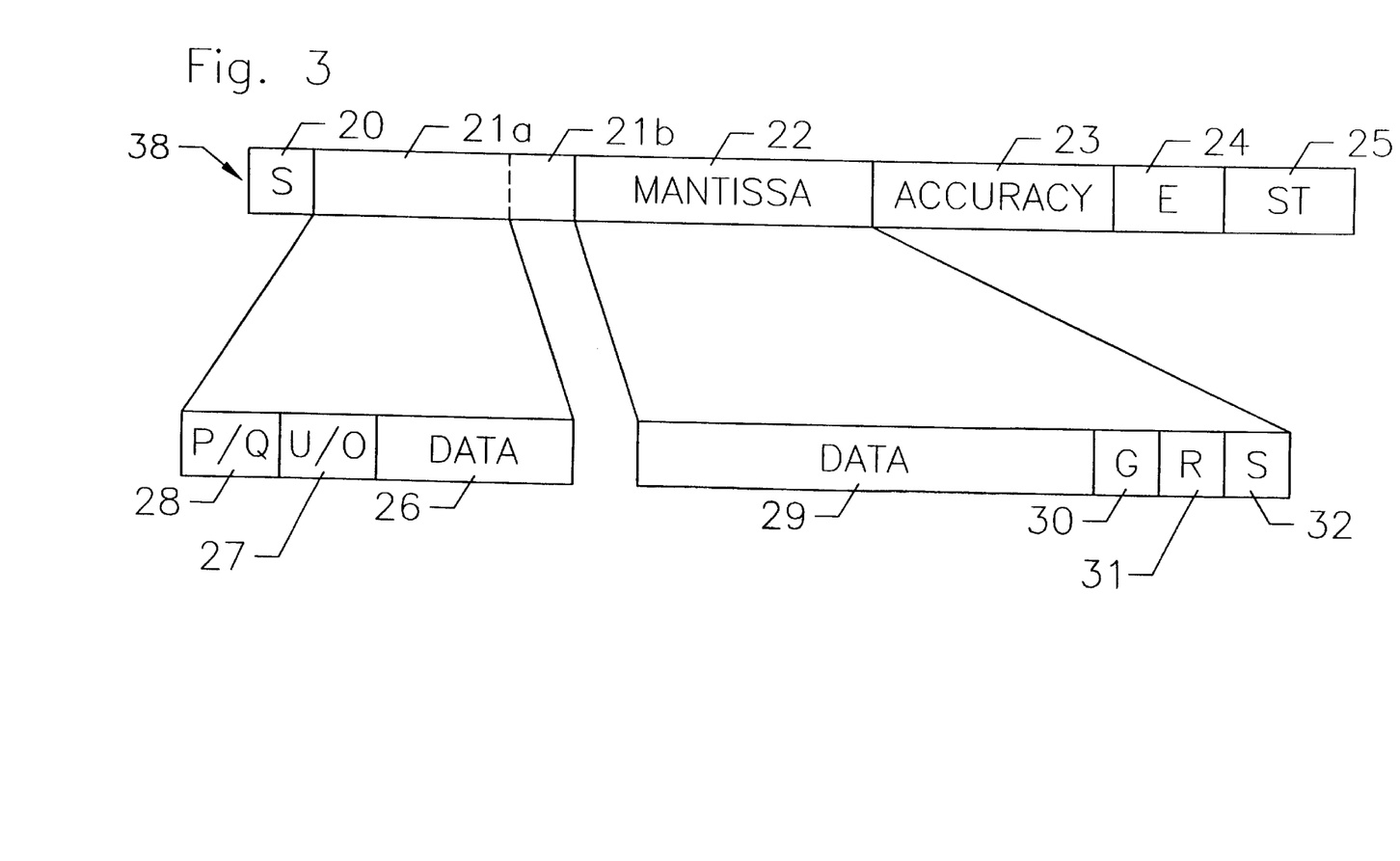
FIG. 3 illustrates a floating-point register format representation of a floating-point operand according to the present invention.

FIG. 3 illustrates a floating-point register format used to store floating-point operands in a floating-point register unit according to the present invention. The floating-point register format is comprised of a floating-point sign field 20 for storing a bit representing the sign information of an operand stored in a floating-point register, the floating-point exponent field 21 of the operand of at least thirteen (13) bits, the normalized floating-point mantissa field 22 of the operand comprising at least fifty-three (53) bits, the floating-point accuracy field 23 of at least six (6) bits in the floating-point register, the floating-point exact field 24 bit in the floating-point register, and the floating-point status field 25 in the floating-point register comprising two (2) or more bits. The number of bits is sufficient to represent double precision numbers and the result of multiplying or dividing two underflow or overflow numbers. It is also adequate to represent zero, infinity, or not-a-number (NaN) without using special exponent or mantissa values.

The floating-point register format typically has an exponent field 21 two or more bits larger than that of any memory format, and is further divided into the floating-point exponent data section 26, the floating-point exponent underflow/ overflow section 27, and the floating-point exponent product/quotient section 28. In the present invention, the underflow/overflow section 21 utilizes one additional bit for encoding underflow and overflow exponents. Another additional bit 28 is used to provide additional exponent range for floating-point processing between the registers and the arithmetic unit.

The floating-point mantissa field 22 is further comprised of a floating-point mantissa data section 29 and, optionally, in accord with the IEEE standard, a floating-point mantissa guard section 30, a floating-point mantissa round section 31, and a floating-point mantissa sticky section 32. The mantissa field 22 is always considered normalized with either an implied or explicit leading mantissa one bit.

The floating-point register format normally utilizes additional bits beyond those needed for the memory format(s). This allows accuracy 23 to be encoded in binary format instead of a comma code, typically comprising five or six bits. The exponent 21 may use additional bits 27 thereby enabling underflow and overflow exponents to be encoded in binary. Additional bits might also be used to encode exactness 24 and to encode the zero, infinity, NaN, and valid number status 25. These bits could perhaps be implemented as implied, or encoded some other way. For way of explanation and for the preferred embodiment, these will be considered as three additional bits of the register format, with exactness 24 requiring one bit and status 25 taking two bits.

Memory to Floating-Point Register Load Means.

FIG. 4 shows a block diagram generally illustrating the method of transferring floating-point operands from memory registers to floating-point registers and from floating-point registers to memory registers. Reference numeral 35 indicates a random access memory (RAM), reference numeral 36 indicates the memory registers in the RAM 35, reference numeral 37 represents a floating-point unit, reference numeral 38 designates the floating-point registers in the floating-point unit 37, reference numeral 39 identifies a load device coupled to the RAM 35 and floating-point unit 37, and reference numeral 40 indicates a store device coupled to the floating-point unit 37 and RAM 35.

The load device 39 can be considered a device with several inputs and/or controls such as priority decoders which converts a memory register 36 representation to the floating-point register 38representation. This memory-to-arithmetic-unit-register processing path is further illustrated in FIG. 5, with data flowing from top to bottom. Decision logic 52 sets the bits of the floating-point register 38 based upon the memory value 36 and the type of primary control 45 selected.

Figure 5:
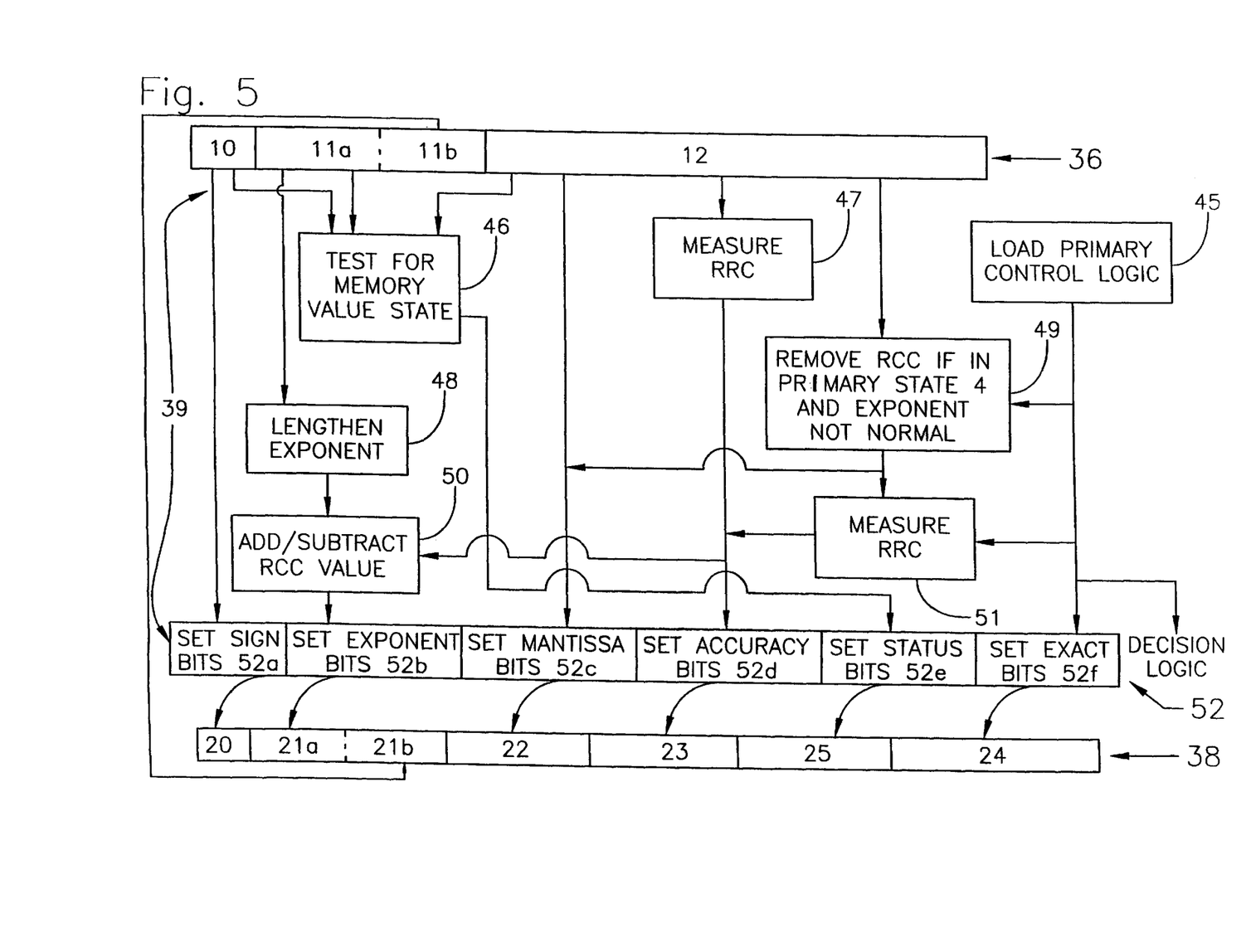
FIG. 5 is a process flow diagram illustrating memory to arithmetic unit register processing in either a hardware or software context.

Represented as logic block 45, primary control makes an adjustment to data flow based upon one of four load modes or states. These four states or types to the primary control 45 of the load device 39 are as follows:

1) load an exact number;
2) load with implied maximal accuracy;
3) load with accuracy encoding for normal numbers and no accuracy encoding for underflow/overflow values; and
4) load with accuracy encoding for both normal and underflow/overflow numbers.

Mathematical constants are often of type 1 and imprecise numbers can often be represented by any of the types 2 through 4. The state of the primary control 45 may be inputted at hardware or software design time, or at execution time as part of the computer instruction set, part of the computer status and controls registers, part of a data item or subroutine name for software implementation, or determined by some other unspecified means. Not all four primary states need be implemented. Additional inputs or controls could serve to control the size and relative location of the memory exponent 11 and mantissa 12 fields, the representation of the sign 10, and the exponent 11 bias and representation.

If the load primary control state 45 calls for an accuracy field 14, it will be taken from the mantissa 12 in the same comma code format as that for the underflow/overflow. The value of the accuracy field 14 is that all bits between the right one bit of the accuracy field and the left "hidden" one bit of the mantissa 12 are accurate. The accuracy value is the number of bits in the remaining mantissa data section 13 including the left-most hidden one bit. The accuracy field 14 is therefore to the left of any underflow/overflow comma code 15. Process flow for decoding accuracy is generally illustrated in logic blocks 47, 49, 51 and 52*d*.

Given the control state and the contents of the memory register 36, the load device 39 converts the memory contents to register contents. In the preferred embodiment, the sign bit 10 is transcribed. The exponent field 11 is extended as needed as illustrated in logic block 48. In an offset binary format the rule is to insert additional zero bits to the left of the most significant exponent bit if it is set, otherwise insert one bits.

The invention is most intuitive if a floating-point value is considered as a range of numbers represented by a single register 38 or memory value 36 rather than a single number. In contrast, the IEEE 754 considers a floating-point number as a specific rational number. A floating-point value representation of the invention might be illustrated in binary, where the value has only its sign and a binary encoding of its numeric content, in the abstract model below:

$$s, \text{------------------------------------} \quad (1)$$

where the location of the decimal point is just to the right of the underscore. The most significant bit (MSB) of the number is to the left of the remaining bits. The displacement or location of the MSB with respect to the decimal point is the logical exponent. Examples are illustrated as follows:

$$s, \text{------------} 1xxxxx \text{-----------------------} \exp = 8 \quad (2)$$

$$s, \text{---------------} 1xxxxx \text{---------------------} \exp = 3 \quad (3)$$

$$s, \text{------------------} 1xxxxx \text{----------------} \exp = -3 \quad (4)$$

where "x" denotes arbitrary bits. The accuracy of the number is marked by a right-most one bit followed by zero bits in the register. The displacement of the one bit (herein below, the one bit of the RCC) with respect to the MSB gives the number of bits of accuracy, as seen below:

$$s, \text{------------------} 1xxxxx1 \text{------------------} \exp = 3, \quad (5)$$

$$acc = 6$$

$$\char`\^MSB \char`\^RCC$$

The sign and the bits from the MSB to the RCC constitute the floating-point value representing a range of numbers. That range of numbers comprises all numbers with bits to the right of the RCC where the RCC is clear or set as the following illustrates:

$$s, \text{------------------} 1xxxxx0????????? \quad (6)$$

$$s, \text{------------------} 1xxxxx1????????? \quad (7)$$

The bits from the MSB to the RCC are placed in the floating-point mantissa register 22 left-justified with any excess discarded. In the present invention, this range of rational numbers is intended when referring to a floating-point value.

Memory value status logic block 46 illustrates the three main components of the memory register 36 being tested for the value of the memory state. In logic block 46, the load device 39 accesses the bit status of the sign 10, exponent 11, and mantissa 12 fields of the memory register 36 and tests to determine the state of the memory value, e.g., zero, normal, NaN, or positive or negative infinity. Once that state is identified, the load device's 39 decision logic 52 loads the value into the floating-point register 38 as defined by pre-established primary control logic 45. Bit loading implementation in the status bits set decision logic block 52*e* may be as a total of eight unique instructions (i.e., the combination of four control states and two floating-point data sizes), or as a mode setting instruction and a single load instruction or some combination thereof.

Accordingly, if the memory register 36 value is zero, NaN, or positive or negative infinity, the floating-point register status 25 is set appropriately in the status decision logic 52*e*. For a memory value 36 of zero, the register representation 25 is that the zero state is set. For infinity, the infinity state is set and the sign bit is valid. For NaN, the NaN state is set. For register representation 38 of underflow, overflow, double underflow and double overflow, the mantissa 22 is normalized. For underflow values, the exponent 21 is less than that of a normal. For overflow values, the exponent 21 is greater than that of a normal. For double underflow, the exponent 21 is less than that of any memory underflow value. For double overflow, the exponent 21 is greater than that of any memory overflow value.

In testing for the memory value status 46, the load device 39 also determines whether the value in the memory exponent field 11 contains an underflow or overflow value, as illustrated in logic block 47. If so, the mantissa 12 will contain a comma code 15 on the right or least significant end. This RCC 15 is examined and removed from the mantissa 12 by means of a priority decoder circuit (e.g., logic block 47) and masking circuits, as illustrated in logic block 49.

It should be noted that the underflow/overflow comma code is always measured in logic block 47. Accuracy may be determined in logic blocks 47 or 51. If there is no underflow or overflow, then accuracy is measured in logic block 47. If there is underflow or overflow and the primary load control state 45 is in control mode 4 (accuracy for all numbers), then accuracy is measured in logic block 51.

Two memory exponent values 11, one for underflow and one for overflow, signal the presence of the memory mantissa comma code 15. The underflow exponent value will be the smallest exponent value and, likewise, the overflow exponent value will be the largest exponent value. For underflow, the true exponent 21 is the smallest exponent value minus the value of the comma code 15. For overflow, the true exponent 21 is the largest exponent value plus the value of the comma code 15. The critical path with the longest logic delay in the memory-to-arithmetic-unit-register process is the adjustment of the exponent 11 by the RCC value 15, as illustrated in logic blocks 47, 48, 50 and 52*b*.

Logic blocks 47, 50 and 52b shows the value of the RCC 15 to be also used to adjust the register exponent field 21 for underflow and overflow values without accuracy encoding, i.e., for primary control type 3. The value of the memory RCC 15 is determined in logic block 47 and then used in the memory exponent RCC addition/substraction logic block 50 to determine the length of the floating-point exponent 21. For underflow values, the value of the comma code 15 gives the amount to decrease the register exponent 21. For overflow values, the value of the comma code 15 gives the amount to increase the exponent 21.

If there is a memory accuracy field 14 in the memory mantissa section 12, the load device 39 examines and uses it to set the register accuracy field 23 in the accuracy bits set decision logic 52d. If there is not an accuracy field 14, register accuracy 23 is set 52d to the number of mantissa 12 bits, including the hidden leading one bit, remaining after any underflow/overflow comma code is removed. The accuracy field 14 is not removed from the mantissa 12. Should control logic 45 require an exact value, the exact bit 24 is set.

A variety of common circuit design techniques can be applied to optimize the performance of the load mechanism 39. In particular:
1) there is no need to normalize the mantissa 12, as there is always a leading hidden one bit;
2) the memory exponent 11 of the underflow/overflow value is simplified in that the exponent is all zeroes or all ones; and
3) the comma code 15 for underflow and overflow need not be removed if there is no accuracy field 14. This is because the one bit is located exactly where the right most hidden one "rounding" bit will be located.

The last optimization listed above favors floating-point types 2 and 3 over type 4 memory representations.

Arithmetic Computation Logic Means.

Once converted from the RAM 35 to the floating-point unit 37, the operand is ready to be arithmetically processed. Arithmetic computation upon values in the floating-point registers 38 might be specified in terms of an input or control state and the state of the register operandi. This is further illustrated in FIG. 7.

Figure 7:
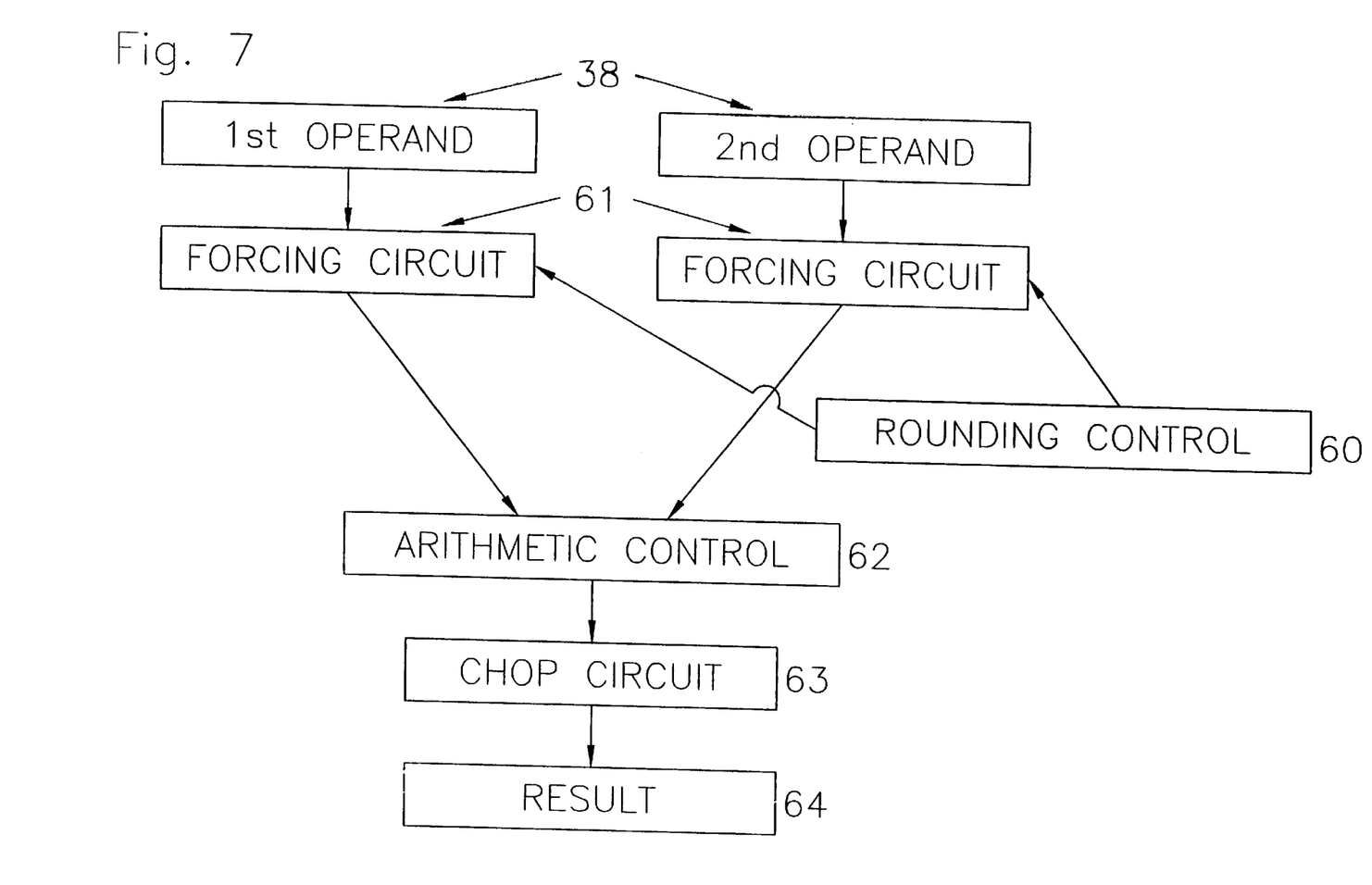
FIG. 7 is a block diagram illustrating the arithmetic process whereby operands are rounded before input to the arithmetic operation.

As with the load primary control logic, the desired state for the arithmetic unit rounding control logic 60 may be expressed during design or during execution by a variety of means such as design decisions, control registers, instruction specification, and others. The control logic 60 contains the encoding for the use to be made of the accuracy fields for each operand, and the use to be made of the rounding field.

The accuracy choices are to either use the operandi as given, or round the operandi to the accuracy given by their respective accuracy fields. By providing two states for accuracy, one can choose between using as much accuracy as the arithmetic unit will provide irrespective of the operand accuracy, or rounding to the operand accuracies. In either case, the accuracy field 23 of the result is set based upon operand accuracy fields 23 and the arithmetic process. Accordingly, one may wish to use the extra bits of accuracy in the arithmetic unit and the extra bits of mantissa data beyond the accurate part of the operands in order to improve the calculation over what would be the mathematical result based purely upon operand accuracies.

Rounding choices are the same as the IEEE standard—round to nearest, round towards zero, round towards positive infinity, and round towards negative infinity. In contrast to the IEEE standard, herein rounding is performed upon operandi and not upon the result, as illustrated in arithmetic logic unit rounding control and forcing circuit logic blocks 60 and 61. By doing so, carry propagation and exponent adjustment in rounding is eliminated.

The rounding rules are that for all except round to nearest, the operand inaccurate bits are replaced by either all one bits or all zero bits, whichever causes the result to move furthest in the rounding direction. For round to nearest, the RCC 15 code is applied to the operands but, in order to have unbiased rounding, the RCC 15 code is complimented when the right-most accurate bit is one. For example, for round to zero and when the operand is exact, the RCC 15 is cleared. For round to positive infinity, the bits to the right of the RCC 15 are set to one. This implementation of rounding achieves the same objectives as that of the IEEE standard, but in a form which offers a simpler or faster electronic circuit realization. The type of rounding in the present invention can thus be said to be forcing the operand 61, i.e., modifying the bits to the right of the accurate bits of the mantissa 22.

Once rounded, floating-point addition, subtraction, multiplication and division is performed in the arithmetic circuit logic block 62 using the two modified operands. It should be understood that for the present invention, the arithmetic computations are performed on pairs of operands representing a range of values, whereas the IEEE 754 floating-point operands represent single binary numbers. The rules for the computation of the result are as follows, where "n" is a number other than zero, infinity or NaN:

1) If any operand is NaN, the result is NaN
2) For Addition or Subtraction—
   a) If subtracting, reverse the sign of the second operand
   b) If 0+n or n+0, the result is n
   c) If infinity+n or n+infinity or infinity+infinity, the result is infinity of the same sign as the infinite operand
   d) If +infinity plus −infinity or −infinity plus +infinity, the result is NaN
   e) For all other cases, perform addition using the exponents to align the mantissas. If the leading mantissa bit moves, renormalize the sum.
3) For Multiplication—
   a) If 0*n or n*0, the result is 0
   b) If 0*infinity or infinity*0, the result is NaN
   c) If n*infinity or infinity*n, the result is infinity with the sign being the exclusive/or of the two operands, i.e., positive if the operands are of the same sign and negative if the operands are of different signs
   d) If infinity*infinity, the result is infinity with the sign being the exclusive/or of the two operands, i.e., positive if the operands are of the same sign and negative if the operands are of different signs
   e) For all other cases, compute the arithmetic product of the two operands, normalize the result, and truncate or chop the mantissa to register mantissa 22 or accuracy 23 length, as generally illustrated in logic blocks 62 and 63
4) For Division—
   a) If 0/n, the result is 0
   b) If n/0, the result is +infinity
   c) If 0/0 or infinity/infinity, the result is NaN
   d) If n/infinity, the result is 0
   e) If infinity/n, the result is infinity with the sign being the exclusive/or of the two operands, i.e., positive if the operands are of the same sign and negative if the operands are of different signs
   f) For all other cases, perform the arithmetic division and normalize the result
5) If the resulting exponent magnitude exceeds the double underflow or double overflow exponent range, the result is replaced by zero or infinity, i.e., the status is set to zero or infinity. The IEEE Standard 754 differs in that if there is an exception, the result is not modified; instead, the exception is raised.

6) For Accuracy Result—
   a) Accuracy of the result from addition or subtraction is the number of bits between the leading mantissa bit of the result and the left most inaccurate bit of the aligned operands
   b) Accuracy of the result from multiplication or division is the smaller of the accuracies of the operands
   c) An exact operand corresponds to unlimited accuracy
   d) Zero, infinity and NaN do not have accuracy The IEEE Standard 754 requires that the result of an arithmetic operation be rounded to a representable IEEE 754 number. In the present invention, once computed, the result is merely truncated or chopped in order that it fit the arithmetic unit's mantissa register 22. In chopping, the bits to the right of a certain place of the result are discarded and replaced by a single one bit and then zeros to fill out the remaining bits.

This chopping or rounding of the result is of the "von Neuman" variety. The simplest way to understand this kind of rounding is to again consider the floating-point numbers 38 herein as representing a range of mathematical values. In the IEEE standard, this range is centered on the encoded floating-point value. In the present invention, the range is centered halfway between the encoded value and the next largest value in the absolute sense.

One way to represent the center of the interval used herein is to append a one bit to the right of the floating-point mantissa 22. If the accuracy option is to use the mantissa 22 as given, the one bit is to the right of all other mantissa bits. If the accuracy option is to round to the value given by the accuracy field 23, the one bit is to the right of all accurate bits of the mantissa 22.

As the arithmetic unit 38 has separate mantissa and accuracy registers, truncation or chopping 63 of the result 64 may be postponed until storing to memory 40. This may be controlled by a mode bit or by an additional control bit in the chop circuit 63. The effect of postponed chopping is to compute with maximal arithmetic unit precision.

Floating-Point Register to Memory Store Means.

Figure 6:
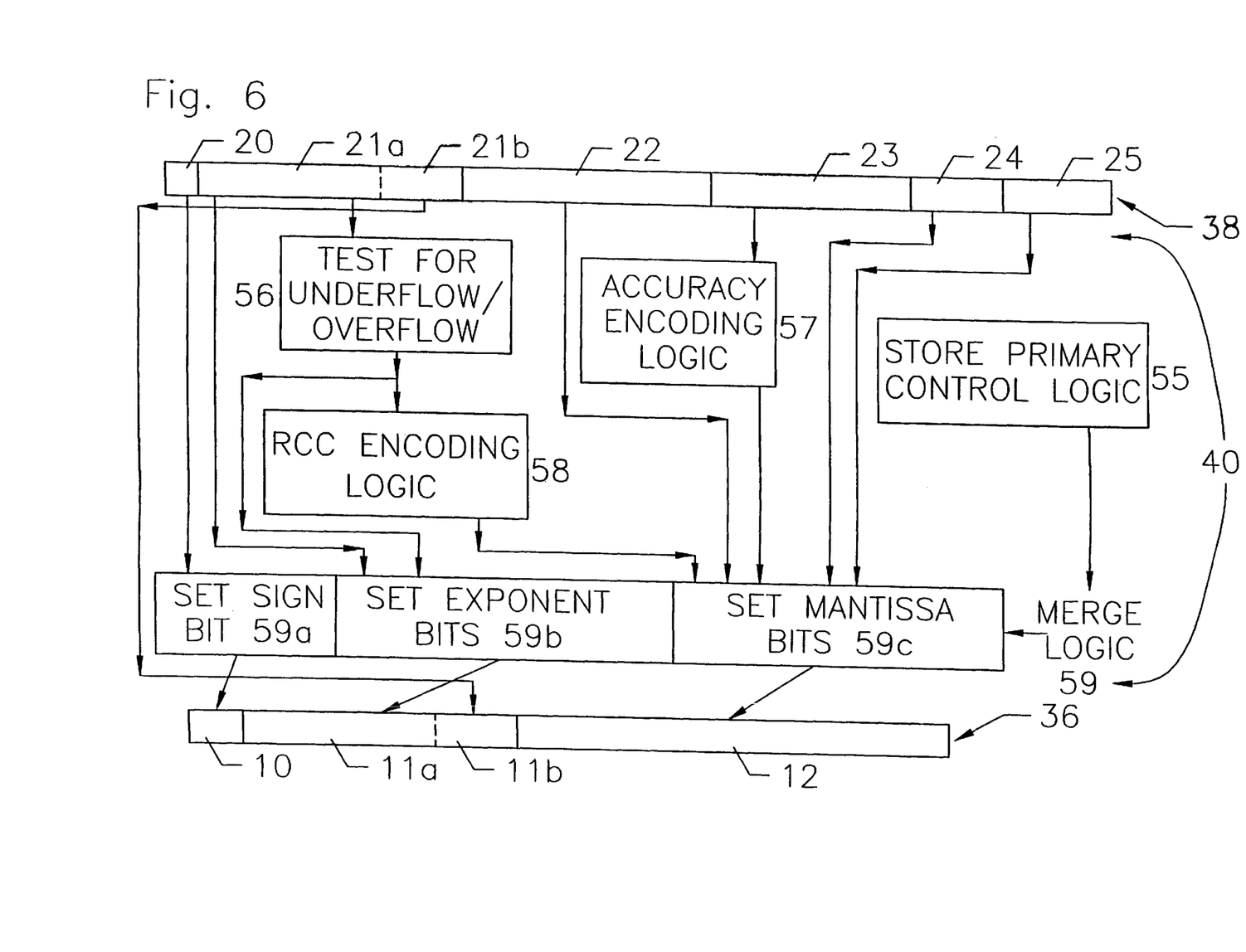
FIG. 6 is a process flow diagram illustrating arithmetic unit register to memory processing in either a hardware or software context.

Once computed, the result may be converted back from a floating-point register 38 to a memory register 36 by means of a store logic device 40. The store device 40 is complimentary to the load device 39. FIG. 6 illustrates this arithmetic-unit-to-memory processing, with data flowing from top to bottom. The same type of input or primary control mechanism 55 is employed. The distinguishing characteristic of the store device 40 is that it may cause exceptions due to the truncation of the mantissa 22 or the exponent 21. Exceptions are generated when the exponent 21 is too large or too small to be encoded and thus the memory data must be forced to an infinity or to zero. An exception may also be generated when the placing of the underflow/overflow comma code forces a reduction in accuracy.

The store device 40, like the load device 39, also has four states to its store primary control logic 55:

1) store exact (raise exception if not exact);
2) store without accuracy encoding (with implied maximal accuracy);
3) store with accuracy encoding for normal numbers and no accuracy encoding for underflow/overflow values; and
4) store with full accuracy encoding (with accuracy encoding for both normal and underflow/overflow numbers).

Again, as with the load device 39, not all four primary states need be implemented. Denormalization of the mantissa 22 is never required due to the use of RCC codes.

Instead of measuring the comma codes for underflow, overflow, and accuracy, the store device 40 of the present invention devises a means for inserting such codes. As with the load device 39, this involves one or more priority encoders and masking circuits, herein referred to as the store device 40. One such priority encoder is illustrated in logic block 57. Here, the accuracy value 23 resulting from the arithmetic operation is converted to encode the accuracy 14 of the memory mantissa 12 as determined by the store primary control logic 55.

For underflow or overflow values, the store device 40 tests the exponent 21 for underflow or overflow, as illustrated in logic block 56. Should the exponent 21 represent an underflow or overflow value, then a RCC priority encoder illustrated in logic block 58 is utilized to convert the value to a RCC code and place that code in the memory mantissa 12 as determined by the store primary control logic 55.

The underflow/overflow and accuracy encoders 57 and 58, can each be considered to generate two items—the RCC 15, and an associated mask for merging the RCC 15 with the mantissa 12 in mantissa bits merge logic block 59c. Merge logic 59 sets the bits of the memory register 36 based upon the value of the floating-point register 38, store primary control logic 55, accuracy encoding logic 57 and RCC encoding logic 58. The exact state 24 and status 25 of the floating-point register 38 is also utilized in the merge logic 59 to set the corresponding fields in the memory register 36 as conditioned by the store primary control logic 55. Loss of accuracy may trigger an inexact exception. A register exponent 21 value beyond a value which can be represented in the memory format 36 may cause the storage of a zero or infinity value.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed and desired to be secured by Letters Patent is as follows:

1. A method for processing floating-point numbers, each floating-point number having at least a sign portion, an exponent portion and a mantissa portion, comprising the steps of:
   converting a floating-point number memory register representation to a floating-point register representation;
   rounding the converted floating-point number;
   performing an arithmetic computation upon said rounded number resulting in a new floating-point value; and
   converting the resulting new floating-point register value to a floating-point memory register representation.

2. The method as recited in claim 1 further comprising the step of designating by load primary control logic circuit a mode for said floating-point number representation to be converted, said mode including load an exact number, load with implied maximal accuracy encoding, load with accuracy encoding only for normal numbers and not for underflow or overflow numbers, and load with accuracy for all numbers.

3. The method as recited in claim 2 wherein said mode is convert with accuracy for all numbers, further comprising the step of removing those bits located on the least significant end of the memory mantissa portion and comprised of a variable number of zero bits and a terminating one bit, the least significant bits being a comma code.

4. The method as recited in claim 3 further comprising the step of determining an accuracy value of the memory mantissa portion, said accuracy value being the number of bits between a rightmost one bit and a leading data bit of said mantissa portion.

5. The method as recited in claim 4 further comprising the step of encoding the accuracy of the floating-point register representation, the accuracy value being said memory mantissa accuracy value.

6. The method as recited in claim 1 further comprising the step of utilizing a comma code to represent the degree of underflow and overflow, wherein said comma code is those bits located on the least significant end of the memory mantissa portion and comprised of a variable number of zero bits and a terminating one bit, the least significant bits being said comma code, thereby eliminating denormalization of the mantissa in said step of converting the floating-point number memory register representation to the floating-point register representation and said step of converting the floating-point number register representation to the floating-point memory representation.

7. The method as recited in claim 6 further comprising the step of utilizing said comma code to represent the degree of overflow, thereby providing a set of values corresponding to underflow numbers.

8. The method as recited in claim 7 wherein said set of provided values creates a symmetric number range resulting in a gradual loss of accuracy for overflow.

9. The method as recited in claim 1 wherein said step of converting the memory register representation further comprises the step of transcribing the memory sign portion to the floating-point sign portion.

10. The method as recited in claim 1 wherein said step of converting the memory register representation further comprises the step of extending the exponent portion.

11. The method as recited in claim 1 further comprising the steps of:
measuring the memory register mantissa portion for an underflow/overflow value, the underflow/overflow value being located on the right or least significant end of the mantissa portion and comprised of zero or more zero bits and a terminating one bit; and
adjusting the memory exponent portion based upon the size of said underflow/overflow value, the underflow value being subtracted from the exponent portion and the overflow value being added to the exponent portion.

12. The method as recited in claim 11 further comprising the steps of setting bits of the floating-point register value based upon the value of said adjusted memory exponent portion.

13. The method as recited in claim 1 wherein said step of converting the memory register representation further comprises the step of testing the memory sign portion, memory exponent portion, and memory mantissa portion to determine the state of the memory register representation.

14. The method as recited in claim 13 further comprising the step of setting bits of the floating-point register representation based upon said state of the memory register representation.

15. The method as recited in claim 1 further comprising the step of designating by arithmetic unit accuracy control logic an accuracy required of the converted floating-point number.

16. The method as recited in claim 1 further comprising the step of designating by arithmetic unit rounding control logic a rounding choice required of the converted floating-point number.

17. The method as recited in claim 16 wherein said rounding choice further comprises modifying bits to the right of an accuracy field of the mantissa portion.

18. The method as recited in claim 1 wherein said arithmetic computation further comprises the steps of chopping the resulting computed floating-point value to fit the mantissa portion; and postponing said chopping until storing to memory thereby computing with maximal precision.

19. The method as recited in claim 1 wherein said step of converting the resulting floating-point register value further comprises the steps of:
testing the floating-point register exponent portion for underflow and overflow;
and inserting said underflow and overflow value into the memory mantissa portion.

20. The method as recited in claim 1 wherein said step of converting the resulting floating-point register value further comprises encoding an accuracy value of the floating-point register representation into the memory mantissa portion.

21. A method for processing floating-point numbers from memory register format to arithmetic unit register format and back, each floating-point number having at least a sign portion, an exponent portion and a mantissa portion, comprising the steps of:
selecting a primary load control mode for a memory register floating-point number to be converted;
testing for a memory value state by accessing bit statuses of the sign portion, exponent portion and mantissa portion of the memory register floating-point number;
converting as required by said primary load control mode the result of said testing of the memory value state into the arithmetic unit register;
selecting a primary arithmetic control mode for an arithmetic register floating-point number to be computed upon;
rounding the arithmetic register floating-point number as required by said primary arithmetic control mode;
performing an arithmetic operation upon the rounded arithmetic register floating-point number;
selecting a primary store control mode for said arithmetic register floating-point number to be converted;
testing the exponent portion of the arithmetic register floating-point number; and
converting as required by said primary store control mode the result of said testing of the exponent portion into the memory register.

22. An apparatus for processing floating-point numbers comprising:
means for converting a floating-point value from a random access memory register to
a floating-point unit register;
means for selecting an accuracy required of the converted value;
means for selecting a rounding choice required of the converted floating-point value;
means for performing an arithmetic operation upon at least one converted floating-point value based upon said selected accuracy and rounding;
means for chopping the result of the arithmetic operation to fit a mantissa portion of a floating-point value; and
means for converting the resulting floating-point value from the floating-point register representation to the random access memory representation.

23. The apparatus as recited in claim 22 further comprising a means for controlling the type of floating-point number to be converted from the random access memory register to the floating-point unit register.

24. The apparatus as recited in claim 22 further comprising a means for controlling the type of floating-point number to be converted from the floating-point unit register to the random access memory register.

25. An apparatus for processing one or more floating-point numbers from memory register format to arithmetic unit register format and back comprising:

one or more priority decoder circuits for converting said floating-point number to be loaded from a random access memory register to a floating-point unit register;

one or more masking circuits for setting the bits of said floating-point numbers from the random access memory register to the floating-point unit register;

one or more priority encoder circuits for rounding said floating-point number to be operated upon in said arithmetic logic unit; an arithmetic logic unit for performing arithmetic operations upon the floating-point register numbers;

one or more priority encoder circuit for converting and encoding said floating-point number to be stored from the floating-point unit register to the random access memory register; and one or more masking circuit for setting the bits or said floating-point numbers from the floating-point unit register to the random access memory register.

26. The apparatus as recited in claim 25 further comprising a test circuit for testing a floating-point unit register floating-point number for underflow and overflow.

27. The apparatus as recited in claim 26 further comprising an encoder circuit for converting the test result into a reverse comma code into the random access memory register.

28. The apparatus as recited in claim 25 further comprising an encoder circuit for converting an accuracy value into the random access memory register.

* * * * *